United States Patent
Yang

(10) Patent No.: US 12,361,421 B2
(45) Date of Patent: Jul. 15, 2025

(54) RECOGNITION METHOD AND DEVICE, SECURITY SYSTEM, AND STORAGE MEDIUM

(71) Applicants: Beijing Wodong Tianjun Information Technology Co., Ltd., Beijing (CN); Beijing Jingdong Century Trading Co., Ltd., Beijing (CN)

(72) Inventor: Dan Yang, Beijing (CN)

(73) Assignees: Beijing Wodong Tianjun Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 382 days.

(21) Appl. No.: 17/925,346

(22) PCT Filed: Mar. 29, 2021

(86) PCT No.: PCT/CN2021/083670
§ 371 (c)(1),
(2) Date: Nov. 15, 2022

(87) PCT Pub. No.: WO2021/238385
PCT Pub. Date: Dec. 2, 2021

(65) Prior Publication Data
US 2023/0177509 A1    Jun. 8, 2023

(30) Foreign Application Priority Data
May 29, 2020    (CN) .......................... 202010477466.6

(51) Int. Cl.
*G06Q 20/40*    (2012.01)
*G06Q 20/38*    (2012.01)
(Continued)

(52) U.S. Cl.
CPC ..... *G06Q 20/40145* (2013.01); *G06Q 20/382* (2013.01); *G06Q 20/389* (2013.01);
(Continued)

(58) Field of Classification Search
CPC .. G06F 16/583; G06Q 20/206; G06Q 20/382; G06Q 20/389; G06Q 20/40145;
(Continued)

(56) References Cited

U.S. PATENT DOCUMENTS

2015/0039458 A1    2/2015  Reid
2018/0096567 A1*   4/2018  Farrow ................ G06V 40/161
(Continued)

FOREIGN PATENT DOCUMENTS

CN    106373240 A    2/2017
CN    107992779 A    5/2018
(Continued)

OTHER PUBLICATIONS

Supplementary European Search Report in the European application No. 21813868.3, mailed on Jul. 26, 2023. 7 pages.
(Continued)

*Primary Examiner* — Ruiping Li
(74) *Attorney, Agent, or Firm* — Cooper Legal Group, LLC

(57) ABSTRACT

A recognition method and apparatus, a security system, and a computer readable storage medium. The method comprises: obtaining at least two first images acquired by a first acquisition device, the first images representing images of a payment behavior of a first user (S101); analyzing the at least two first images to obtain a first analysis result, the first analysis result representing a payment result generated by the payment behavior (S102); and determining identity information of the first user according to the first analysis result, the identity information representing whether the first
(Continued)

user is a suspected user that does not perform payment (S103).

14 Claims, 5 Drawing Sheets

(51) Int. Cl.
  *G06Q 20/42* (2012.01)
  *G06Q 30/0601* (2023.01)
  *G06V 40/16* (2022.01)

(52) U.S. Cl.
  CPC ......... *G06Q 20/42* (2013.01); *G06Q 30/0609* (2013.01); *G06V 40/172* (2022.01)

(58) Field of Classification Search
  CPC ............... G06Q 20/4016; G06Q 20/42; G06Q 30/0609; G06V 20/52; G06V 40/172; G06V 40/23
  See application file for complete search history.

(56) References Cited

U.S. PATENT DOCUMENTS

| | | | |
|---|---|---|---|
| 2018/0240090 | A1 | 8/2018 | Yokoyama |
| 2019/0279010 | A1 | 9/2019 | Xie et al. |
| 2019/0371134 | A1* | 12/2019 | Chen ................ G06V 40/103 |
| 2023/0013957 | A1 | 1/2023 | Farrow |

FOREIGN PATENT DOCUMENTS

| | | |
|---|---|---|
| CN | 108364422 A | 8/2018 |
| CN | 109002772 A | 12/2018 |
| CN | 208796390 U | 4/2019 |
| CN | 110853262 A | 2/2020 |
| CN | 111161486 A | 5/2020 |
| CN | 112257487 A | 1/2021 |
| EP | 3367352 A1 | 8/2018 |
| JP | 2016173735 A | 9/2016 |
| JP | 2018041255 A | 3/2018 |

OTHER PUBLICATIONS

International Search Report in the international application No. PCT/CN2021/083670, mailed on Jun. 29, 2021, 3 pgs.
English translation of the Written Opinion of the International Search Authority in the international application No. PCT/CN2021/083670, mailed on Jun. 29, 2021, 5 pgs.

* cited by examiner

RECOGNITION METHOD AND DEVICE, SECURITY SYSTEM, AND STORAGE MEDIUM

CROSS-REFERENCE TO RELATED APPLICATIONS

The application is based on and claims priority to Chinese Patent Application No. 202010477466.6 filed on May 29, 2020, the entire contents of which are incorporated herein by reference in its entirety.

TECHNICAL FIELD

The disclosure relates to the field of recognition technologies, and in particular to a recognition method and device, a security system, and a computer-readable storage medium.

BACKGROUND

With the gradual rise of unmanned supermarkets, self-checkout measures have brought a lot of convenience to customers. Especially for young groups, self-checkout seems particularly convenient. However, without supervision of cashiers, self-checkout has led to a phenomenon of a customer intentionally missing scanning commodities or scanning no commodity, bringing property loss to a supermarket. In the related art, in order to reduce the property loss, the supermarket needs to employ a large number of loss prevention personnel to supervise and inspect such phenomenon. The way to achieve supervision of the phenomenon of intentionally missing scanning commodities or not scanning any commodity through human supervision and inspection greatly consumes manpower and is lack of intelligence.

SUMMARY

In order to solve technical problems in the related art, embodiments of the disclosure provide a recognition method and device, a security system, and a computer-readable storage medium.

Technical solutions of the embodiments of the disclosure are implemented as follows.

An embodiment of the disclosure provides a recognition method, including the following operations.

At least two first images acquired by a first acquisition apparatus and representing images of a payment behavior of a first user are obtained.

The at least two first images are analyzed to obtain a first analysis result representing a payment result generated by the payment behavior.

Identity information of the first user is determined according to the first analysis result, the identity information represents whether the first user is a suspected user who has not made payment.

An embodiment of the disclosure provides a recognition device, including a first obtaining unit, an analysis unit and a determination unit.

The first obtaining unit is configured to obtain at least two first images acquired by a first acquisition apparatus and representing images of a payment behavior of a first user.

The analysis unit is configured to analyze the at least two first images to obtain a first analysis result representing a payment result generated by the payment behavior.

The determination unit is configured to determine identity information of the first user according to the first analysis result, the identity information represents whether the first user is a suspected user who has not made payment.

An embodiment of the disclosure provides a security system, including a first acquisition apparatus and a processing apparatus.

The first acquisition apparatus is configured to acquire at least two first images representing images of a payment behavior of a first user.

The processing apparatus is configured to: obtain the at least two first images; analyze the at least two first images to obtain a first analysis result representing a payment result generated by the payment behavior; and determine identity information of the first user according to the first analysis result, the identity information represents whether the first user is a suspected user who has not made payment.

An embodiment of the disclosure provides a computer-readable storage medium, having stored thereon computer programs, here the computer programs implement operations of the above recognition method when executed.

An embodiment of the disclosure provide a computer device, including a memory, a processor and computer programs stored in the memory and executable on the processor, here the processor implements steps of the above recognition method when executing the programs.

The embodiments of the disclosure provide a recognition method and device, a security system, and a computer-readable storage medium. The method includes the following operations. At least two first images acquired by a first acquisition apparatus and representing images of a payment behavior of a first user are obtained. The at least two first images are analyzed to obtain a first analysis result representing a payment result generated by the payment behavior. Identity information of the first user is determined according to the first analysis result, the identity information represents whether the first user is a suspected user who has not made payment.

In the embodiments of the disclosure, it may be determined whether the first user is a user who has made payment normally (i.e., a non-suspected user) or a user who has not made payment normally (i.e., a suspected user) through the analysis result of at least two (first) images acquired by the first acquisition apparatus and representing the payment behavior of the first user. In this way, automatic recognition of users with behaviors of intentionally missing or skipping out bills is achieved, which reduces consumption of manpower, achieves intelligent recognition of behaviors of missing or skipping out bills, improves intelligence, and reduces input of manpower costs and economic costs compared to the related art.

BRIEF DESCRIPTION OF THE DRAWINGS

In order to illustrate the technical solutions in the embodiments of the disclosure or the related art more clearly, drawings used in descriptions of the embodiments or the related art will be described briefly as follows. It is apparent that the drawings in the following descriptions are only embodiments of the disclosure, and other drawings may be obtained by those of ordinary skill in the art according to the provided drawings without paying any creative work.

DETAILED DESCRIPTION

Figure 1:
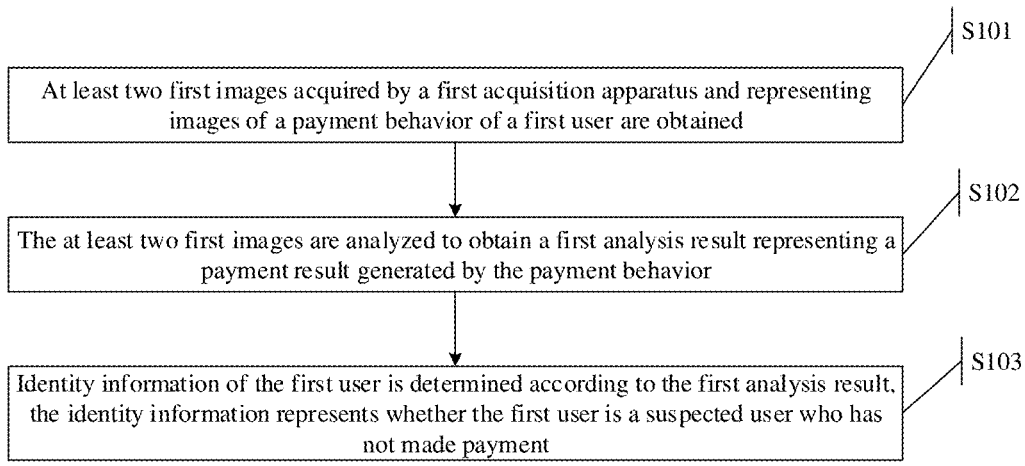
FIG. 1 is a first schematic flowchart of an implementation of a recognition method according to an embodiment of the disclosure.

In order to make the purpose, technical solutions and advantages of the disclosure more clearly, the technical solutions in the embodiments of the disclosure will be described clearly and completely below in conjunction with the drawings in the embodiments of the disclosure. It is apparent that the described embodiments are only a part of the embodiments of the disclosure, rather than not all of them. Based on the embodiments of the disclosure, all other embodiments obtained by those of ordinary skill in the art without paying any creative work fall within the scope of protection of the disclosure. The embodiments of the disclosure and features therein may be arbitrarily combined with each other without conflict. Operations shown in a flowchart of the drawings may be performed in a computer system such as a set of computer-executable instructions. Furthermore, although a logical sequence is shown in the flowchart, in some cases, the operations shown or described may be performed in an order different from that shown here.

An embodiment of the disclosure provides a recognition method applied to a security system. The security system includes at least one first acquisition apparatus and a processing center. Here the first acquisition apparatus is configured to acquire images of a payment behavior of a user such as a purchaser or customer, and the processing center is configured to obtain the images acquired by the first acquisition apparatus to recognize whether the user is a user who has made payment normally, or recognize identity of a user who has not made payment normally, for example, recognize identity of a user who intentionally missed payment or made no payment. In a specific implementation, the processing center may be any processor, chip or functional module with analysis and computation functions, such as a Central Processing Unit (CPU), a Digital Signal Processor (DSP), or a Field Programmable Gate Array (FPGA).

In a practical application, the first acquisition apparatus may be a camera disposed at a location where it may acquire whether the user has made payment, such as a location near a self-checkout machine or a designated location of the self-checkout machine, for example, a location above the self-checkout machine, so as to facilitate acquisition of the payment behavior of the user. It is considered that there are usually at least two self-checkout machines in a supermarket or shopping mall with an autonomous settlement function, the number of first acquisition apparatuses provided in the embodiment of the disclosure is greater than or equal to the number of self-checkout machines. For example, one camera is provided for each self-checkout machine, or at least two cameras are provided for each self-checkout machine. In a practical application, one camera may be provided for each self-checkout machine. It may be understood that in case that at least two cameras are provided for each self-checkout machine, each camera is disposed at a different location of the self-checkout machine, for example, a camera is disposed above the self-checkout machine and a camera is disposed below the self-checkout machine. In the embodiment of the disclosure, it is considered that the user makes a limited range of activity when he/she is paying for commodities, one camera may be provided for each self-checkout machine, and one camera may acquire behaviors generated by the user within the range of activity.

FIG. 1 is a schematic flowchart of an implementation of a recognition method according to an embodiment of the disclosure. As shown in FIG. 1, an executive body performing operations S101 to S103 is the processing center. The method includes the following operations.

In operation S101, at least two first images acquired by a first acquisition apparatus and representing images of a payment behavior of a first user are obtained.

In this operation, the first acquisition apparatus performs acquisition of the first images, and the processing center receives the images acquired and forwardly sent by the first acquisition apparatus; or, the first acquisition apparatus receives a triggering signal sent by the processing center, sends the acquired images after receiving the triggering signal, and the processing center receives the images sent by the first acquisition apparatus based on the triggering signal. It may be understood that reception, of the images acquired by the first acquisition apparatus, of the processing center may be performed in real time or in a certain period. In a practical application, the reception may be performed in real time, so that whether there is a customer intentionally missing payment or making no payment may be recognized in real time, and real-time capability and effectiveness of recognition may be ensured.

In a practical application, in a scenario where the supermarket or shopping mall use self-checkout machines for checkout, the self-checkout machine may present a payment interface, and in case of having detected a customer's operation on payment function keys in the payment interface presented by a certain self-checkout machine, such as clicking, sliding, or the like, the processing center triggers the first acquisition apparatus such as a camera disposed above the self-checkout machine to start, so as to acquire images of the customer's behaviors during payment, such as picking up a commodity, aligning the commodity code to a code scanning side of the self-checkout machine to scan the commodity code, putting down the commodity, and aligning the customer's payment code to the code scanning side of the self-checkout machine to scan the payment code, or the like.

In operation S102, the at least two first images are analyzed to obtain a first analysis result representing a payment result generated by the payment behavior.

In this operation, the processing center analyzes the at least two first images, which is equivalent to analyzing the customer's payment behaviors represented by the at least two first images, such as picking up a commodity, aligning the commodity code to a code scanning side of the self-checkout machine to scan the commodity code, putting down the commodity, and aligning the customer's payment code to the code scanning side of the self-checkout machine to scan the payment code, or the like. In a specific implementation, it is considered that during the customer's payment, there will be actions such as picking up a commodity, aligning the commodity code to a code scanning side of the self-checkout machine to scan the commodity code, putting down the commodity, or the like, and there will be action behaviors such as aligning the customer's payment code to the code scanning side of the self-checkout machine to scan the payment code, after all the commodities have been scanned, or the like. The processing center recognizes the above behaviors according to each of the first images acquired by the first acquisition apparatus, and recognizes a result of the customer having made payment or having not made payment according to the above recognized behaviors.

From the technical aspect, recognizing a behavior of the customer picking up the commodity is taken as an example, and in a process of the customer picking up the commodity and taking the commodity to the code scanning side of the self-checkout machine for alignment, as the commodity is picked up and aligned, a proportion of the commodity appearing in an image gradually increases in multiple first images acquired by the first acquisition apparatus. When the processing center calculates each image acquired by the first acquisition apparatus (e.g., image 11, image 12, image 13 . . . image 1N, N is a positive integer greater than or equal to 2) during the process and a proportion of a picture representing the commodity to the corresponding image in each image, and then finds that the proportion of the picture representing the commodity to the corresponding image is gradually increasing in each image such as from 0 to 50%, the processing center recognizes that the customer has a behavior of picking up the commodity. Correspondingly, recognizing a behavior of the customer putting down the commodity is taken as an example, when the processing center calculates each image acquired by the first acquisition apparatus (e.g., image 21, image 22, image 23 . . . image 2M, M is a positive integer greater than or equal to 2) during the process (from aligning with the code scanning side to putting down the commodity) and a proportion of a picture representing the commodity to the corresponding image in each image, and then finds that the proportion of the picture representing the commodity to the corresponding image is gradually decreasing in each image such as from 50 to 0%, the processing center recognizes that the customer has a behavior of putting down the commodity.

Recognizing a behavior of aligning the commodity code to the code scanning side of the self-checkout machine is taken as an example, when the processing center calculates each image acquired by the first acquisition apparatus (e.g., image 31, image 32, image 33 . . . image 3K, K is a positive integer greater than or equal to 2) during the process (from picking up the commodity to aligning the commodity code with the code scanning side) and a proportion of a picture representing the commodity code to the corresponding image in each image, and then finds that the proportion of the picture representing the commodity code to the corresponding image is gradually increasing in each image, the processing center recognizes that the customer has a behavior of aligning the commodity code to the code scanning side of the self-checkout machine to scan the commodity code.

Similarly, recognizing a behavior of aligning the customer's payment code to the code scanning side of the self-checkout machine is taken as an example, when the processing center calculates each image acquired by the first acquisition apparatus (e.g., image 41, image 42, image 43 . . . image 4P, P is a positive integer greater than or equal to 2) during the process (from picking up a cellphone to aligning the customer's payment code with the code scanning side) and a proportion of a picture representing the customer's payment code to the corresponding image in each image, and then finds that the proportion of the picture representing the customer's payment code to the corresponding image is gradually increasing in each image, the processing center recognizes that the customer has a behavior of aligning the customer's payment code to the code scanning side of the self-checkout machine.

In operation S103, identity information of the first user is determined according to the first analysis result, the identity information represents whether the first user is a suspected user who has not made payment.

It may be understood that in a practical application, when the customer has not missed or skipped out a bill maliciously, there must be action behaviors such as picking up a commodity, aligning the commodity code to a code scanning side of the self-checkout machine to scan the commodity code, putting down the commodity, and aligning the customer's payment code to the code scanning side of the self-checkout machine to scan the payment code, after all the commodities have been scanned, or the like. Based on acquisition of the first images by the first acquisition apparatus, the processing center recognizes the above behaviors one by one, and in case of recognizing the above behaviors in sequence, the processing center confirms that the current user (i.e., the customer) whose images are acquired by the first acquisition apparatus, is a customer or user who makes payment normally without missing or skipping out a bill maliciously. In case of missing or skipping out a bill maliciously, one or some of the above behaviors must be lost, such as the behavior of aligning the commodity code to the code scanning side of the self-checkout machine to scan the commodity code, the behavior of picking up the commodity, and/or the behavior of scanning the payment code. When the processing center recognizes that a behavior such as picking up the commodity, aligning the commodity code to the code scanning side of the self-checkout machine to scan the commodity code, and/or scanning the payment code, is not present through recognition of the above behaviors, the processing center may consider that the customer has not made payment normally and thus is a suspected user. Furthermore, in order to avoid the customer from missing a bill maliciously, the processing center is also required to count the recognized number of times of picking up the commodity, the recognized number of times of aligning the commodity code to the code scanning side, and the recognized number of times of putting down the commodity. When the three counts are consistent, the processing center may consider that the customer has made payment normally without behaviors of missing or skipping out a bill.

In the foregoing operations S101 to S103, it may be determined whether the first user is a user who has made payment normally (i.e., a non-suspected user) or a user who has not made payment normally (i.e., a suspected user) through the analysis result of at least two (first) images acquired by the first acquisition apparatus and representing the payment behavior of the first user. In this way, automatic recognition of users with behaviors of intentionally missing or skipping out bills is achieved, which reduces consumption of manpower, achieves intelligent recognition of behaviors of missing or skipping out bills, improves intelligence, and reduces input of manpower costs and economic costs compared to the related art.

Figure 2:
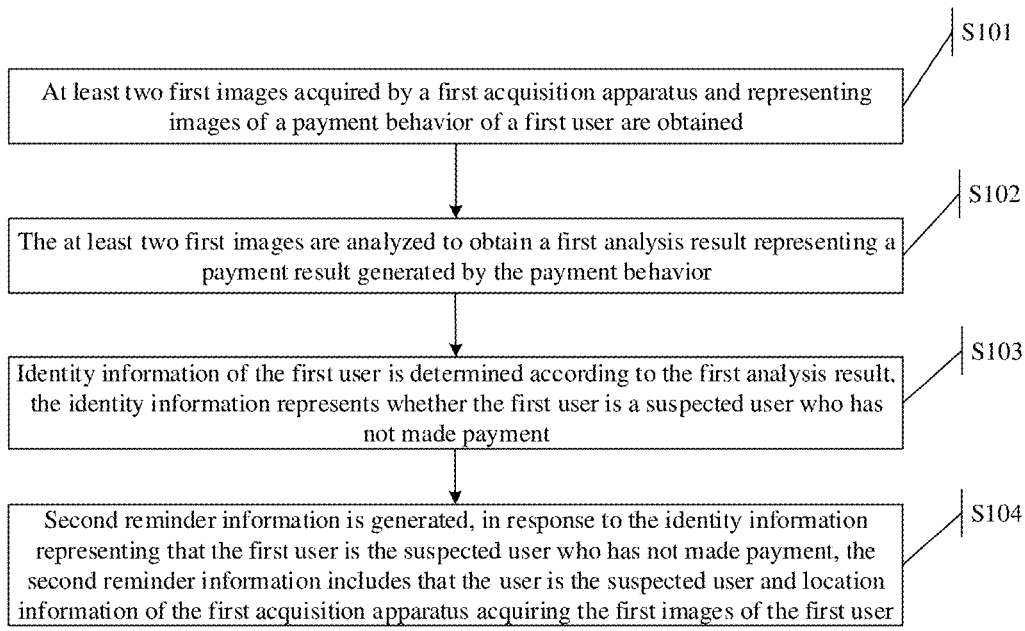
FIG. 2 is a second schematic flowchart of an implementation of a recognition method according to an embodiment of the disclosure.

In an embodiment, as shown in FIG. 2, the method may further include the following operations.

In operation S104, second reminder information is generated, in response to the identity information representing that the first user is the suspected user who has not made payment, the second reminder information includes that the user is the suspected user and location information of the first acquisition apparatus acquiring the first images of the first user.

It may be understood that in a practical application, there are multiple settlement exits in a supermarket or shopping mall, and a self-checkout machine is provided at each of the settlement exits, and a camera is disposed above each self-checkout machine, so that each time a customer appears at the settlement exit to make a settlement, recognition of the customer or user appeared at the settlement exit being a suspected user or not, may be performed by solutions of foregoing operations S101 to S103. In a process of disposing each camera, the processing center is also required to record a location of each camera and identify cameras at different self-checkout machines, for example, the camera at a self-checkout machine 1 is camera 1, and the camera at a self-checkout machine 2 is camera 2, or the like. In this way, when the processing center receives images acquired by a camera, the processing center is also required to recognize an identifier of the camera, for example, recognize that the received images are images acquired by the camera 1, or recognize that the received images are images acquired by the camera 2. In case that the processing center recognizes a suspected user based on images acquired by which camera, the processing center reads or calls location information where the camera is located and generates the (second) reminder information which not only reminds a security personnel that a user with missing or skipping out a bill appears, but also reminds the security personnel that the user with missing or skipping out a bill appears near to which camera (equivalent to which settlement exit), so as to remind the security personnel to manually monitor the history suspected user at that location, to avoid further loss of the supermarket property due to the history suspected user missing or skipping out a bill again, which reflects intelligence.

Figure 3:
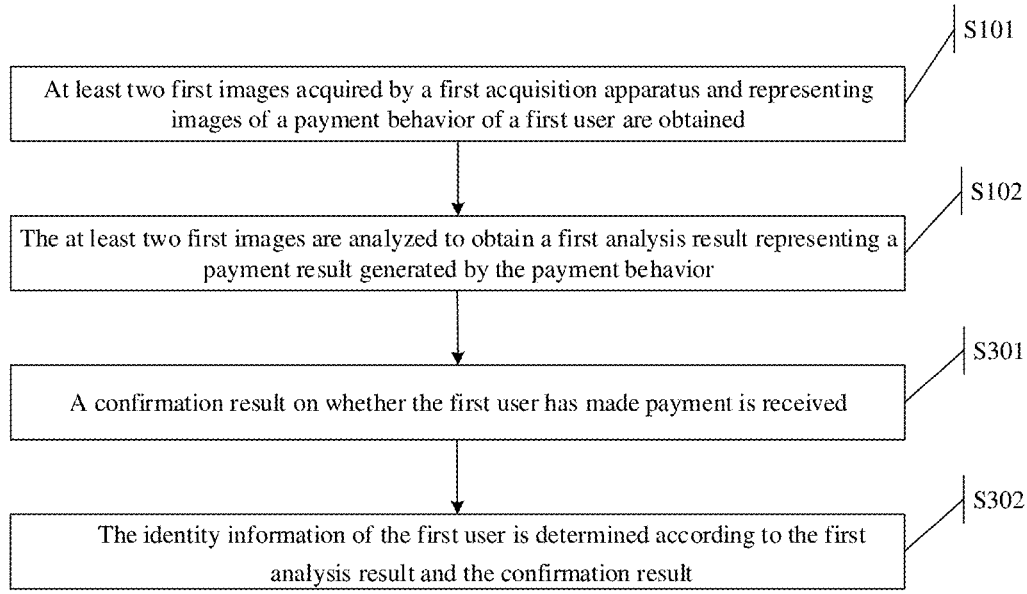
FIG. 3 is a third schematic flowchart of an implementation of a recognition method according to an embodiment of the disclosure.

In an embodiment, as shown in FIG. 3, the method may further include the following operations.

In operation S301, a confirmation result on whether the first user has made payment is received.

Accordingly, the operation S103 of determining the identity information of the first user according to the first analysis result may include the following operations.

In operation S302, the identity information of the first user is determined according to the first analysis result and the confirmation result.

It may be understood that the foregoing operations S301 and S102 are not present in a strict sequential order and may also be performed simultaneously. The confirmation result of the operation S301 is equivalent to a manual confirmation result on determining whether the first user is a suspected user by manually viewing the images acquired by the first acquisition apparatus, and the processing center combines the manual confirmation result and the first analysis result recognized by itself to perform final confirmation of the identity information of the first user. It is equivalent to combining information from both the manual confirmation result and the first analysis result to confirm whether the first user is a user with behaviors of missing or skipping out a bill, which may ensure confirmation of a suspicious user's identity information.

It may be understood that a series of action behaviors of the customer may be recognized from the images acquired by the first acquisition apparatus, such as picking up a commodity, aligning the commodity code to a code scanning side of the self-checkout machine to scan the commodity code, putting down the commodity, and aligning the customer's payment code to the code scanning side of the self-checkout machine to scan the payment code, after all the commodities have been scanned, or the like. In the embodiment of the disclosure, the processing center may also send the images acquired by the first acquisition apparatus to a management side of the security system. In an embodiment, in case that the first acquisition apparatus has acquired images of a process of the customer paying a bill, it may forwardly send the acquired images to the management side. In an embodiment, the management side of the security system sends a triggering signal to the first acquisition apparatus, and the first acquisition apparatus sends images of a process of the customer paying a bill acquired by itself to the management side, after receiving the triggering signal. In a practical application, the management side may receive the images acquired by the first acquisition apparatus and sent by the processing center. The management side may present the images acquired by the first acquisition apparatus in form of a video, a management personnel (such as a security personnel) of the management side may view the video, for example, view the video in real time. Through viewing the video in real time, the security personnel may monitor the customer currently purchasing commodities in real time, to confirm whether the customer has behaviors of missing or skipping out a bill. The security personnel may obtain a (manual) confirmation result that a customer is not a suspected user or is a suspected user through viewing the video in real time. The security personnel input the manual confirmation result to the management side, and the management side receives the above information input by the security personnel and sends the manual confirmation result to the processing center. The processing center receives the manual confirmation result sent from the management side and combines the manual confirmation result and the first analysis result to confirm whether the customer has behaviors of missing or skipping out a bill. Usually, in case that the manual confirmation result and the first analysis result are consistent, the above confirmation is based on either the manual confirmation result or the first analysis result. In case that the manual confirmation result and the first analysis result are not consistent, the above confirmation is based on the first analysis result, or the security personnel is reminded to go to the site in time for further confirmation. For example, it may be confirmed that the current customer at the settlement exit 1 has a behavior of missing a bill, through the security personnel manually monitoring the images acquired by the first acquisition apparatus in real-time. Furthermore, the processing center confirms from the first analysis result obtained by itself that the customer at the settlement exit 1 has a behavior of missing a bill, then the processing center receives the manual confirmation result sent by the management side, and combines it with the result recognized by itself to confirm that the customer at the settlement exit 1 has a behavior of missing a bill.

In an embodiment, in response to determining the identity information of the first user to represent that the first user is the suspected user who has not made payment, the processing center receives a confirmation result on whether the first user has made payment, and re-determines the identity information of the first user according to the confirmation result. That is, in case that the processing center confirms that the first user is a suspected user according to a result of analyzing the first images by itself, the processing center is also required to combine the analysis result with the manual confirmation result received by itself, to re-confirm whether the first user is a suspected user, so as to avoid occurrence of an erroneous recognition of the processing center. In a practical application, the processing center confirms that a user is a suspected user according to the result of analyzing the first images by itself, and the security personnel confirms that the user has a behavior of missing a bill through monitoring the images acquired by the first acquisition apparatus in real time, then the processing center confirms that the user is a suspected user in case of receiving the above manual confirmation result as obtained by the security personnel. In this way, it may ensure an accurate confirmation on whether the user is a suspected user and avoid occurrence of an erroneous recognition of the user's identity.

Figure 4:
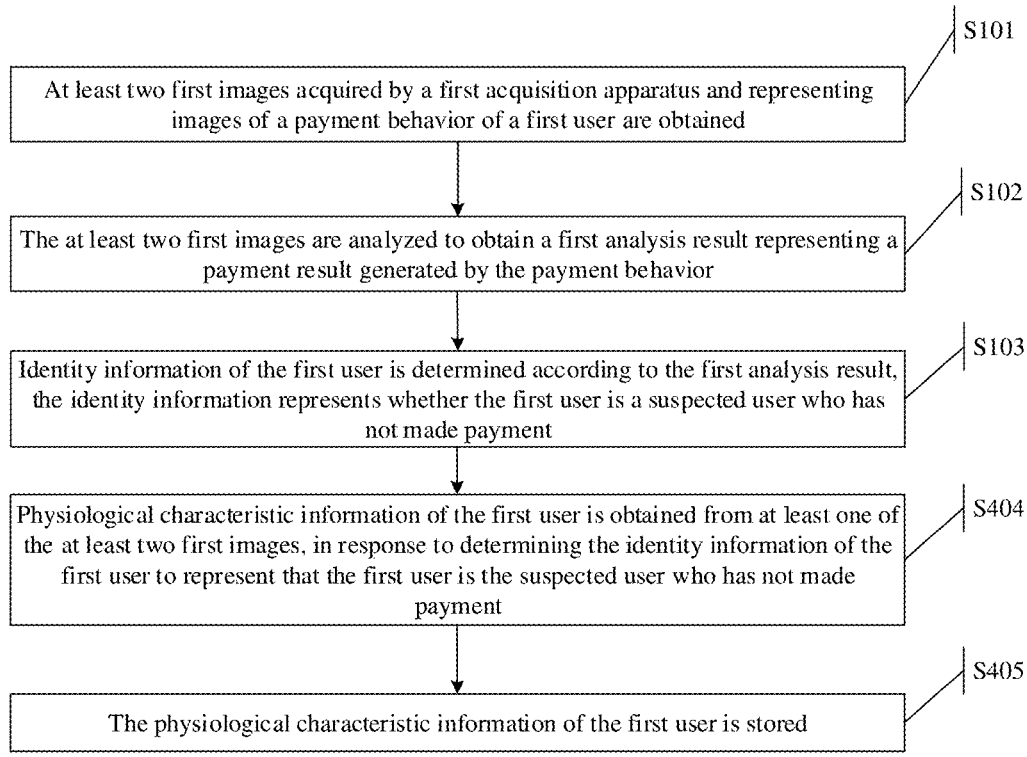
FIG. 4 is a fourth schematic flowchart of an implementation of a recognition method according to an embodiment of the disclosure.

In an embodiment, as shown in FIG. 4, the method may further include the following operations.

In operation S404, physiological characteristic information of the first user is obtained from at least one of the at least two first images, in response to determining the identity information of the first user to represent that the first user is the suspected user who has not made payment.

In operation S405, the physiological characteristic information of the first user is stored.

An executive body performing operations S404 and S405 is the processing center. In case that the processing center recognizes existence of a suspected user, i.e., a user missing or skipping out a bill, the processing center recognizes, from at least one image acquired by the first acquisition apparatus, physiological characteristic information of the user, such as face images, eye mask images, iris images, and/or eardrum images, and identifies the user with malicious behaviors through the characteristic information. In case of recognizing the above characteristic information of the suspected user, the above recognized characteristic information is stored or saved to form a blacklist. It realizes automatic acquisition of the physiological characteristic information of the user missing or skipping out a bill, and reflects intelligence. It may be understood that the blacklist records physiological characteristic images, such as face images, eye mask images, iris images, and/or eardrum images, of a user with behaviors of missing or skipping out a bill (historically). A process of using the blacklist in the embodiments of the disclosure is described in subsequently relevant descriptions.

It may be known that in case that the identity information of the first user represents that the first user is a suspected user who has not made payment, either the operation S204 or operations S404+S405 may be performed in an alternative way (an order in which they are performed in an alternative way is not limited), or may also be performed simultaneously. In case that they are performed simultaneously, it is equivalent to: in case of having recognized a suspected user, not only recognizing physiological characteristic information of the suspected user, but also generating reminder information to remind which camera (equivalent to which settlement exit) the user missing or skipping out a bill is near to, realizing intelligent and humanized recognition of the suspected user.

Figure 5:
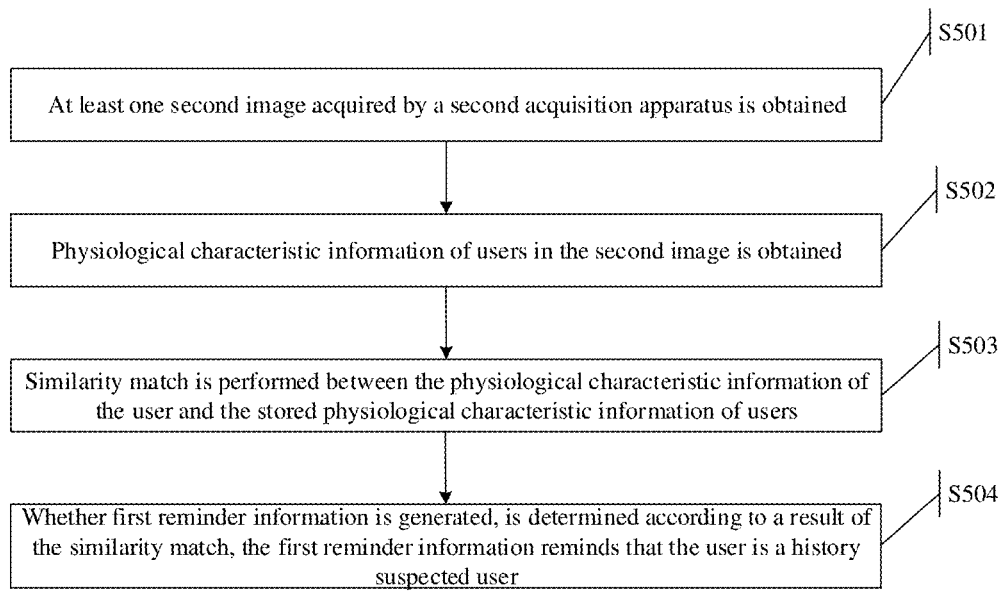
FIG. 5 is a fifth schematic flowchart of an implementation of a recognition method according to an embodiment of the disclosure.

Combined with the recognition method shown in FIG. 4, the recognition method provided by the embodiments of the disclosure also includes processes of the solution shown in FIG. 5. Here an executive body performing operations S501~S504 is the processing center, and the method includes the following operations.

In operation S501, at least one second image acquired by a second acquisition apparatus is obtained.

In this operation, in contrast to the first acquisition apparatus, a second acquisition apparatus is also provided in the embodiment of the disclosure. In a practice application, the second acquisition apparatus is a camera, which may be disposed at the entrance or exit of a supermarket or shopping mall. The camera may be disposed at the entrance, so that in case that a customer enters the supermarket or shopping mall through the entrance, the camera may acquire images of the customer. There may be one second acquisition apparatus, or there may be at least two second acquisition apparatuses, which is not specifically limited here. For example, a camera is disposed at the entrance of a supermarket or shopping mall, the camera captures images of each customer entering the supermarket or shopping mall, that is, the camera acquires (second) images of the customer entering the supermarket or shopping mall. The processing center receives the images acquired and forwardly sent by the second acquisition apparatus; or, the second acquisition apparatus receives a triggering signal sent by the processing center, sends the acquired images after receiving the triggering signal, and the processing center receives the images sent by the second acquisition apparatus based on the triggering signal. It may be understood that reception, of the images acquired by the second acquisition apparatus, of the processing center may be performed in real time or in a certain period. In a practical application, the reception may be performed in real time, so that a customer with behaviors of missing or skipping out a bill historically may be recognized in real time.

In operation S502, physiological characteristic information of users in the second image is obtained.

In this operation, it is considered that among the second images acquired by the second acquisition apparatus, not every second image is an image containing a customer's face, thus images with faces are selected from the second images, and face characteristic, eye mask characteristic, iris characteristic, and/or eardrum characteristic of a user or customer are recognized from the selected images by a face recognition technology.

In operation S503, similarity match is performed between the physiological characteristic information of the user and the stored physiological characteristic information of users.

In operation S504, whether first reminder information is generated, is determined according to a result of the similarity match, the first reminder information reminds that the user is a history suspected user.

In operations S503 and S504, similarity match is performed between at least one physiological characteristic among the recognized face characteristic, eye mask characteristic, iris characteristic and eardrum characteristic of the user or customer, and physiological characteristic images of users with behaviors of missing or skipping out a bill historically who are recorded in the stored blacklist. For example, when face characteristic of a customer entering a shopping mall or supermarket is recognized, similarity match is performed between the recognized face characteristic of the customer and face characteristic of each history suspected user recorded in the blacklist. When it is found through match that similarity between face characteristic of a customer currently entering the shopping mall or supermarket and face characteristic of a history suspected user recorded in the blacklist reaches a predetermined threshold, such as 80%, the customer currently entering the shopping mall or supermarket may be recognized as a user with behaviors of missing or skipping out a bill historically, and (first) reminder information is generated to remind a security personnel of the supermarket or shopping mall that a suspected user enters the shopping mall or supermarket currently, so as to remind the security personnel to monitor a process of the history suspected user currently purchasing commodities in time, to avoid further loss of the supermarket property. Here the predetermined threshold may be set flexibly according to an actual situation and may not be limited to the above value, for example, may take a value of 60% or 90%.

It may be known that when it is found through match that similarity between face characteristic of a customer currently entering the shopping mall or supermarket and face characteristic of each history suspected user recorded in the blacklist does not reach a predetermined threshold, such as 80%, the customer currently entering the shopping mall or supermarket may be recognized as a normal user without behaviors of missing or skipping out a bill historically and is allowed to enter the supermarket or shopping mall.

It may be understood that solutions of the foregoing operations S501 to S504 are equivalent to using the physiological characteristic images of users with behaviors of missing or skipping out a bill historically who are recorded in the stored blacklist and the images of each customer entering the supermarket or shopping mall acquired by the cameras disposed at the entrance of the supermarket or shopping mall, to recognize whether the customer is a user with behaviors of missing or skipping out a bill historically, that is, whether the customer is a history suspected user. The process of the history suspected user currently purchasing commodities may be monitored, to avoid further loss of the supermarket property. Here recognition of the history suspected user according to the physiological characteristic information of the customer or user may ensure accuracy of the recognition and improve degree of the accuracy of the recognition.

The embodiments of the disclosure are further described in detail below in conjunction with FIG. 6 to FIG. 9, taking an unmanned supermarket as an example of application scenarios.

Figure 6:
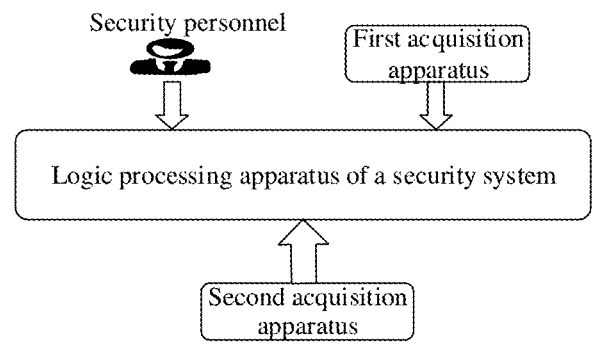
FIG. 6 is a first schematic structural diagram of a security system according to an embodiment of the disclosure.

As shown in FIG. 6, in the present application scenario, for example, a camera (the second acquisition apparatus) configured to acquire faces is mounted at the entrance or exit of the unmanned supermarket, and a camera (the first acquisition apparatus) is mounted above a self-checkout machine at a settlement exit, and when a Point Of Sale (POS) machine is considered as a kind of self-checkout machines, the first acquisition apparatus may be disposed on the POS machine. The security system includes the above two kinds of acquisition apparatuses. In terms of data acquisition as well as data processing, the security system in the present application scenario includes the above two kinds of acquisition apparatuses and a logic processing apparatus.

Here data of the security system comes from acquisition or capturing of images of customers entering the supermarket, by the camera mounted at the entrance or exit of the supermarket, and acquisition or capturing of images representing payment behaviors of customers, by the camera mounted above the self-checkout machine.

Logic processing of the security system is mainly performed by the logic processing apparatus. The logic processing apparatus includes at least a processing center. The processing center receives multiple images acquired by the camera mounted above the self-checkout machine, and recognizes action behaviors from the multiple images, such as picking up a commodity, aligning the commodity code to a code scanning side of the self-checkout machine to scan the commodity code, putting down the commodity, and aligning the customer's payment code to the code scanning side of the self-checkout machine to scan the payment code, after all the commodities have been scanned, or the like. The processing center recognizes the above behaviors one by one, and in case of recognizing the above behaviors in sequence, the processing center confirms that the user (i.e., the customer) whose images are acquired by the first acquisition apparatus, is a customer or user who makes payment normally without missing or skipping out a bill maliciously. When the processing center recognizes that a behavior such as picking up the commodity, aligning the commodity code to the code scanning side of the self-checkout machine to scan the commodity code, and/or scanning the payment code, is not present through recognition of the above behaviors, the processing center may consider that the customer has not made payment normally and thus is a suspected user. The processing center recognizes physiological characteristic information such as face characteristic of the suspected user from at least one image acquired by the first acquisition apparatus, and adds face characteristic images of the user to the blacklist. Furthermore, in order to avoid the customer from missing a bill maliciously, the processing center is also required to count the number of times of recognized behaviors of picking up the commodity, the number of times of recognized behaviors of aligning the commodity code to the code scanning side, and the number of times of recognized behaviors of putting down the commodity. When the three counts are consistent, the processing center may consider that the customer has made payment normally without behaviors of missing or skipping out a bill.

For the images acquired by the camera disposed at the entrance of the supermarket, the processing center receives the images acquired by the camera, recognizes face characteristics in the images, and performs similarity match between the recognized face characteristics and face characteristics recorded in the blacklist. When it is found through match that similarity between face characteristic of a customer currently entering the shopping mall or supermarket and face characteristic of a history suspected user recorded in the blacklist reaches a predetermined threshold, such as 80%, the customer currently entering the shopping mall or supermarket may be recognized as a user with behaviors of missing or skipping out a bill historically, and (first) reminder information is generated to remind a security personnel of the supermarket or shopping mall that a suspected user enters the shopping mall or supermarket currently, so as to remind the security personnel to monitor the history suspected user, to avoid further loss of the supermarket property due to the history suspected user missing or skipping out a bill again.

In the embodiment of the disclosure, in order to facilitate management of image data acquired by the two kinds of acquisition apparatuses (the first acquisition apparatus and the second acquisition apparatus), then in the embodiment of the disclosure, for the second acquisition apparatus, the images of customers entering the supermarket acquired by the camera disposed at the entrance or exit of the supermarket may be sent by the camera to a security platform firstly, and the security platform recognizes that which camera disposed at which entrance of the supermarket sends the data currently, and sends the images acquired by the camera to the processing center for image processing through Hypertext Transfer Protocol (HTTP) data. Here HTTP data may contain device information (i.e. information related to the camera) and images acquired in real time. When there are a large number of cameras disposed at the entrance or exit of the supermarket, the security platform may pre-configure different cameras to use different Internet Protocol (IP) addresses, so that HTTP data corresponding to different cameras contains different device information, which may be understood as using different HTTP to send images. In this way, the security platform may know from the device information contained in the received HTTP data that: images contained in the currently received HTTP data come from which camera at the entrance of the supermarket. In an embodiment, the images of customers entering the supermarket acquired by the camera disposed at the entrance or exit of the supermarket may be sent directly from the camera to the security system (which means that the security platform is not needed). The security system may pre-configure different cameras to use different IP addresses, so that HTTP data sent by different cameras contains different device information, which may be understood as using different HTTP to send images. The security system may know from the device information contained in the received HTTP data that: images contained in the currently received HTTP data come from which camera at the entrance of the supermarket.

Figure 7:
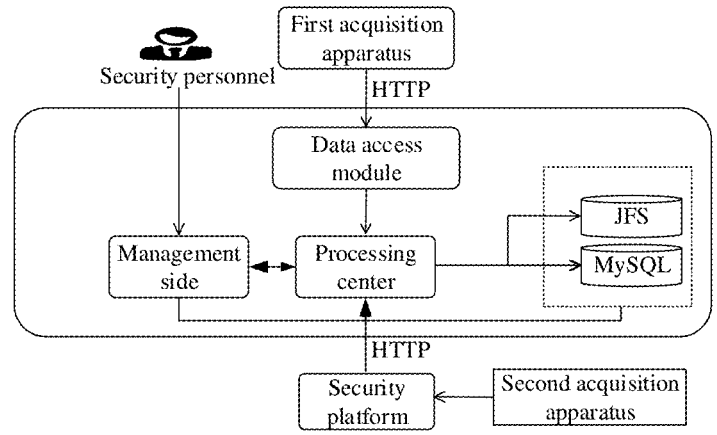
FIG. 7 is a second schematic structural diagram of a security system according to an embodiment of the disclosure.

For the first acquisition apparatus, as shown in FIG. 7, the security system, specifically the logic processing apparatus, includes a data access module, and multiple images acquired by the camera mounted above the self-checkout machine are sent from the camera to the data access module firstly, and then sent from the data access module to the processing center. Of course, the images may also be sent directly from the camera to the processing center.

Since there are a large number of self-checkout machines in the supermarket, naturally, there are also a large number of cameras mounted above each self-checkout machine in the supermarket. In order to facilitate knowing that the images received by the processing center are acquired by a camera at which location (equivalent to which settlement exit), the data access module or the security system (in case of absence of the data access module) may pre-configure different first acquisition apparatuses to use different IP addresses, so that HTTP data corresponding to different first acquisition apparatuses contains different device information, which may be understood as using different HTTP to send images. The processing center may know from the device information contained in the received HTTP data that: images contained in the currently received HTTP data come from a camera on which self-checkout machine (at the settlement exit) (assuming that one camera is mounted above one self-checkout machine).

Furthermore, it is considered that in a practical application, there a large number of self-checkout machines and cameras, and locations of self-checkout machines in the supermarket are relatively fixed, and the camera (the first acquisition apparatus) which may acquire a customer's payment process may be disposed at any reasonable location in the supermarket, and does not have to be disposed on the self-checkout machine, that is, the camera configured to acquire the customer's payment process may be disposed at a flexible and variable location in the supermarket. Based on this, IP address of each first acquisition apparatus and IP address of each checkout apparatus such as a self-checkout machine may be obtained in advance, and the IP address of each first acquisition apparatus and the IP address of the self-checkout machine associated with each first acquisition apparatus are recorded in correspondences to form a first association relationship. Location information of each self-checkout machine (which may be location information of each self-checkout machine in the supermarket) is obtained in advance, and the location information of each self-checkout machine and the IP address of each self-checkout machine are recorded in correspondences to form a second association relationship. In an embodiment, the IP address of each first acquisition apparatus, and the IP address and the location information of the self-checkout machine associated with each first acquisition apparatus are recorded in correspondences to form a association relationship (a third association relationship) associated with the foregoing three items. Here a self-checkout machine associated with a certain first acquisition apparatus such as a camera may consider that the camera is configured to acquire images of a user who makes payment through the self-checkout machine. In case that the processing center receives images acquired by a certain camera, the processing center parses IP address of the camera, and when the processing center confirms through analysis that a customer in the images acquired by the camera has behaviors of missing or skipping out a bill, the processing center may know IP address of a self-checkout machine used by the user missing or skipping out a bill, according to IP address of the camera and the recorded first association relationship; and then the processing center may know that the user missing or skipping out a bill has behaviors of missing or skipping out a bill at which self-checkout machine, according to the IP address of the self-checkout machine used by the user missing or skipping out a bill and the recorded second association relationship. In an embodiment, the processing center may determine directly according to the third association relationship that: the user missing or skipping out a bill is located at which self-checkout machine, and may generate reminder information (a third reminder information) to remind which self-checkout machine the user missing or skipping out a bill is located at.

It may be understood that the foregoing solution may be considered as a further description of a technical solution in which the processing center in the embodiment of the disclosure obtains identifier information such as IP address of the first acquisition apparatus, in response to obtaining the at least two first images acquired by the first acquisition apparatus; determines location information of a checkout apparatus associated with the first acquisition apparatus at least according to the identifier information of the first acquisition apparatus; and generates third reminder information, in response to the identity information representing that the first user is the suspected user who has not made payment, the third reminder information includes that the user is the suspected user and location information of a checkout apparatus associated with a first acquisition apparatus which is capable of acquiring images of the suspected user. It may be understood that the foregoing first reminder information, second reminder information and third reminder information may be generated separately or may be generated simultaneously and sent to a security personnel's cellphone for reminding him/her, and that the second reminder information and the third reminder information may be generated simultaneously and sent to the security personnel's cellphone for reminding him/her, which is not specifically limited here.

Furthermore, the data access module may be configured to store the images acquired by the camera disposed on the self-checkout machine. Of course, the images acquired by the two kinds of acquisition apparatuses and the blacklist may be stored in a predefined database, such as JFS (Jingdong FILE SYSTEM) database shown in FIG. 7, which is a distributed storage system developed by Jingdong independently. When data is written into the distributed system, three copies of the data are written by default, and the distributed storage system may feedback that data is written successfully only after all the three copies are written successfully, and data of the three copies is consistent, so that security and consistency of writing data may be ensured. Furthermore, the distributed system has a function of expanding capacity automatically, and may expand the capacity automatically according to an actual to-be-stored quantity. When a user wants to view the data written into the system, a way of accessing the data may be set, such as allowing isolation from external networks, setting a security level of specified data, and only allowing legal users to view private data. For data objects stored in the system and accessible through a public network, the system has a content delivery network (CDN) acceleration function to improve accessing speed. For the data stored in the system, since 3 portions (3 copies) of the data are stored in the system by default, the data stored in the system has certain persistence. Persistence of the data may also be improved by increasing the number of copies or using erasure coding according to actual usage requirements.

Figure 8:
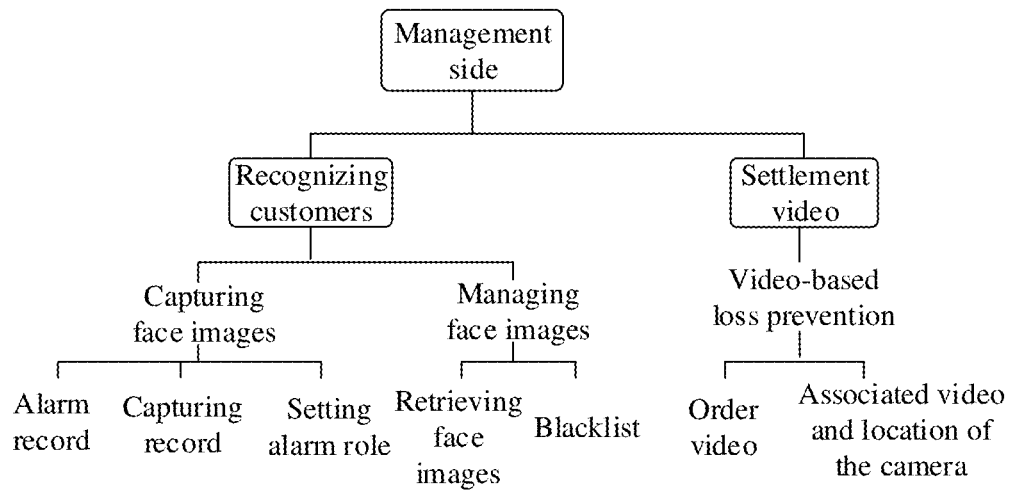
FIG. 8 is a schematic function diagram of a management side of a security system according to an embodiment of the disclosure.

As shown in FIG. 7, the security system, specifically the logic processing apparatus, also includes a management side, which may be used by a security personnel to configure related information and view the related information. As shown in FIG. 8, main functions of the management side are as follows.

1. Configuring an alarm role. Both the foregoing first reminder information and second reminder information may be considered as alarm information. In case that the processing center generates alarm information, the processing center sends the alarm information to a security personnel's cellphone to remind the security personnel of existence of a customer missing or skipping out a bill. Configuring the alarm role is equivalent to configuring the alarm information to be sent to a specified cellphone, such as the security personnel's cell phone.

Here the alarm information may be stored in MySQL database shown in FIG. 7. MySQL is an open-source relational database management system (RDBMS), uses the most commonly used database management language (i.e., Structured Query Language (SQL)) for database management, and supports personalized changing.

2. Updating contents recorded in the blacklist, such as adding contents, deleting contents, changing contents, or the like. In the embodiment of the disclosure, the blacklist may be formed or used according to the foregoing solutions of FIG. 4 and FIG. 5, furthermore, the contents recorded in the blacklist may be manually input by a security personnel to the management side to achieve adding, deleting and changing of face images of suspected users recorded in the blacklist, or the like. For example, face images of those missing or skipping out a bill found through the security personnel's manual inspection are added to the blacklist. In the embodiment of the disclosure, the blacklist may be stored in any of the foregoing databases, or may be stored in other databases such as HBase, or may be stored in a memory or hard disk of the security system, which is not specifically limited here.

3. Saving the images acquired by the camera above the self-checkout machine and the location information of the camera associatively. When the customer is making settlement, images of the settlement process and location information of a camera acquiring the images are saved into an order video. It may be understood that there a large number of images acquired during the customer's settlement process, and acquisition of these images is actually equivalent to acquisition or capturing of a video or videotape of the settlement process.

Furthermore, location information of each self-checkout machine and IP address of each self-checkout machine are recorded in correspondences. IP address of each camera and IP address of the self-checkout machine associated with each camera are recorded in correspondences. In an embodiment, IP address of each camera, and location information and IP address of the self-checkout machine associated with each camera are recorded directly in correspondences, which is equivalent to recording the IP address and the location information of the self-checkout machine and the IP address of the camera directly.

4. Viewing the alarm records. History alarm information is stored in a database such as MySQL, a security personnel may query the history alarm information from MySQL database at the management side. Of course, the security personnel may also query real-time alarm information.

5. Viewing image acquisition (capturing) records. A security personnel may view the acquired or captured history face images acquired at the entrance and exit of the unmanned supermarket through the management side.

6. Retrieving face images. The management side may directly match similar face images in the blacklist, according to the images (further to say, face images) acquired by the camera at the entrance of the supermarket. This function may be used to view whether people currently entering the supermarket are already present in the blacklist.

It may be understood that in the embodiment of the disclosure, a solution of matching the images (further to say, face images) acquired by the camera at the entrance of the supermarket with face characteristic images in the blacklist, and generating reminder information according to the matching result may be performed by the processing center or by the management side.

7. Making the order video. A security personnel may manually view a video of a customer's checkout through the management side. Through this function, the security personnel may manually find out suspected people who missed scanning commodities or skipped out a bill, to avoid missing recognition of suspected people by the processing center.

The above are functions mainly implemented by the management side. It may be understood that the management side in the embodiment of the disclosure also has other conceivable management functions. In short, the management side is a device or an apparatus provided to facilitate the security personnel to view, confirm or update related data, and may reflect diversity of human-computer interaction functions.

Figure 9:
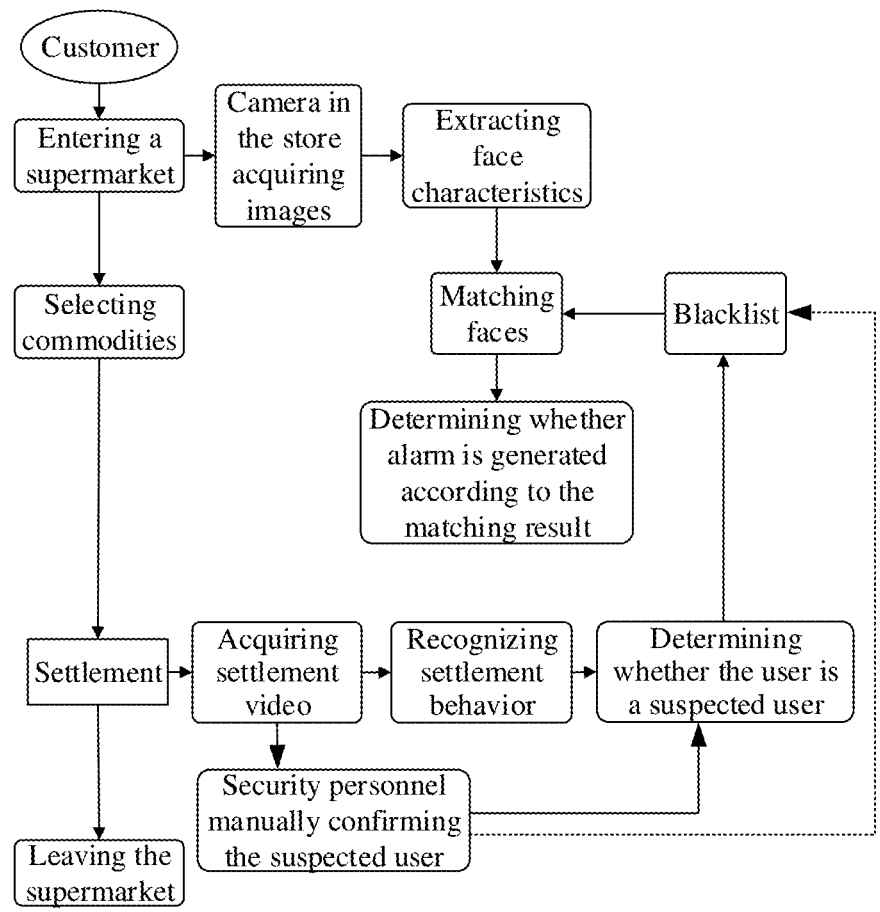
FIG. 9 is a schematic diagram of a specific implementation of a recognition method in an application scenario of an unmanned supermarket according to an embodiment of the disclosure.

As shown in FIG. 9, it is a main flow of a user purchasing commodities in an unmanned supermarket (entering the supermarket, selecting commodities, making commodity settlement and leaving the supermarket). For the main flow, a processing flow of the security system is shown as follows.

When each customer makes settlement in front of one of self-checkout machines in the supermarket, the whole settlement process is acquired by the camera mounted on the self-checkout machine and sent to the processing center. The processing center recognizes actions behaviors of the customer one by one, such as picking up a commodity, aligning the commodity code to a code scanning side of the self-checkout machine to scan the commodity code, putting down the commodity, and aligning the customer's payment code to the code scanning side of the self-checkout machine to scan the payment code, after all the commodities have been scanned, or the like. In case of recognizing the above behaviors in sequence (equivalent to recognizing a settlement behavior), the processing center confirms that the customer is a customer or user who makes payment normally without missing or skipping out a bill maliciously. When the processing center recognizes that a behavior such as picking up the commodity, aligning the commodity code to the code scanning side of the self-checkout machine to scan the commodity code, and/or scanning the payment code, is not present through recognition of the above behaviors, which is equivalent to having not recognized the settlement behavior, the processing center may consider that the customer has not made payment normally and thus is a suspected user, and the processing center generates the second reminder information, that is, alarm information, and sends the alarm information to a security personnel's cellphone. The security personnel may manually monitor a process of the history suspected user currently purchasing commodities according to the alarm information, to avoid further loss of the supermarket property due to the history suspected user missing or skipping out a bill again. Furthermore, the processing center recognizes physiological characteristic information such as face characteristic of the suspected user from the acquired images, and adds face characteristic images of the user to the blacklist. The security personnel may manually confirm which customers are customers with behaviors of missing or skipping out a bill, by viewing the settlement video in real time or at a regular interval, and add the customers' face images to the blacklist. In an embodiment, the processing center may combine a result recognized by itself and a result on whether the user is a suspected user by manual confirmation of the security personnel, to determine whether the current customer's face image is added to the blacklist.

Furthermore, in case that a customer entered a supermarket, any monitoring camera disposed in the supermarket (store), such as a monitoring camera disposed at the entrance of the supermarket, may acquire images of the customer entering the supermarket. The processing center receives the images acquired by the camera, recognizes face characteristics in the images by using a face recognition technology, and performs similarity match between the recognized face characteristics and face characteristics recorded in the blacklist. When it is found through match that similarity between face characteristic of a customer currently entering the shopping mall or supermarket and face characteristic of a history suspected user recorded in the blacklist reaches a predetermined threshold, such as 80%, the customer currently entering the supermarket may be recognized as a user with behaviors of missing or skipping out a bill historically, and (first) reminder information is generated to remind a security personnel of the supermarket or shopping mall that a suspected user enters the shopping mall or supermarket currently, and the first reminder information is sent to the security personnel's cellphone, so as to remind the security personnel to monitor the history suspected user manually, to avoid further loss of the supermarket property due to the history suspected user missing or skipping out a bill again.

It may be understood by those skilled in the art that in a process of purchasing commodities in an unmanned supermarket, the foregoing recognition solution may be considered as a solution for loss prevention of the unmanned supermarket. Cameras or webcams disposed on self-checkout machines and cameras configured for monitoring and disposed at the entrance or exit of the supermarket or any other reasonable location are used to complete data acquisition. Recognition of customers missing or skipping out bills, and recognition of customers with behaviors of missing or skipping out bills historically are achieved by the processing center. Corresponding alarm information is generated to remind an internal personnel such as a security personnel of the supermarket, to achieve the purpose of intelligent loss prevention.

Figure 10:
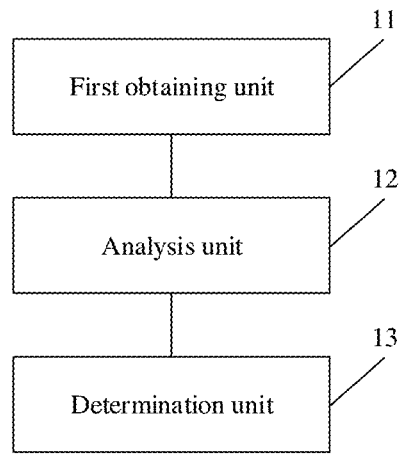
FIG. 10 is a schematic structural diagram of a recognition device according to an embodiment of the disclosure.

An embodiment of the disclosure also provides a recognition device, as shown in FIG. 10, the device includes a first obtaining unit 11, an analysis unit 12 and a determination unit 13.

The first obtaining unit 11 is configured to obtain at least two first images acquired by a first acquisition apparatus and representing images of a payment behavior of a first user.

The analysis unit 12 is configured to analyze the at least two first images to obtain a first analysis result representing a payment result generated by the payment behavior.

The determination unit 13 is configured to determine identity information of the first user according to the first analysis result, the identity information represents whether the first user is a suspected user who has not made payment.

In an embodiment, the device may include a second obtaining unit. The second obtaining unit is configured to obtain physiological characteristic information of the first user from at least one of the at least two first images, in response to the determination unit 13 determining the identity information of the first user to represent that the first user is the suspected user who has not made payment, and store the physiological characteristic information in a storage unit of the device.

In an embodiment, the device may include a third obtaining unit, a fourth obtaining unit, a matching unit and a first generation unit.

The third obtaining unit is configured to obtain at least one second image acquired by a second acquisition apparatus.

The fourth obtaining unit is configured to obtain physiological characteristic information of users in the second image.

The matching unit is configured to perform similarity match between the physiological characteristic information of the user and the stored physiological characteristic information of users.

The first generation unit is configured to determine, according to a result of the similarity match, whether first reminder information is generated, the first reminder information reminds that the user is a history suspected user.

In an embodiment, the device may include a reception unit.

The reception unit is configured to receive a confirmation result on whether the first user has made payment.

Accordingly, the determination unit 13 is configured to determine the identity information of the first user according to the first analysis result and the confirmation result.

In an embodiment, the reception unit is configured to in response to the determination unit 13 determining the identity information of the first user to represent that the first user is the suspected user who has not made payment: receive a confirmation result on whether the first user has made payment. Accordingly, the determination unit 13 is configured to re-determine the identity information of the first user according to the confirmation result.

In an embodiment, the device may include a second generation unit.

The second generation unit is configured to generate second reminder information, in response to the determination unit 13 determining the identity information to represent that the first user is the suspected user who has not made payment, the second reminder information includes that the user is the suspected user and location information of the first acquisition apparatus acquiring the first images of the first user.

In an embodiment, the first acquisition apparatus may include at least two first acquisition apparatuses, each of which is configured to acquire the first images of the first user at a checkout apparatus associated with it.

The first obtaining unit 11 is configured to obtain identifier information of the first acquisition apparatus, in response to obtaining the at least two first images acquired by the first acquisition apparatus.

A location determination unit of the device is configured to determine location information of a checkout apparatus associated with the first acquisition apparatus at least according to the identifier information of the first acquisition apparatus.

A third generation unit of the device is configured to generate third reminder information, in response to the identity information representing that the first user is the suspected user who has not made payment, the third reminder information includes that the user is the suspected user and location information of a checkout apparatus associated with a first acquisition apparatus which is capable of acquiring images of the suspected user.

It may be understood that in a practical application, each of the first obtaining unit 11, the analysis unit 12, the determination unit 13, the second obtaining unit, the third obtaining unit, the fourth obtaining unit, the matching unit, the first generation unit, the second generation unit, the location determination unit and the third generation unit of the device may be implemented by a processor of the recognition device, such as Central Processing Unit (CPU), Digital Signal Processor (DSP), Microcontroller Unit (MCU) or Field Programmable Gate Array (FPGA), and the reception unit may be implemented by a communication interface of the recognition device.

Figure 11:
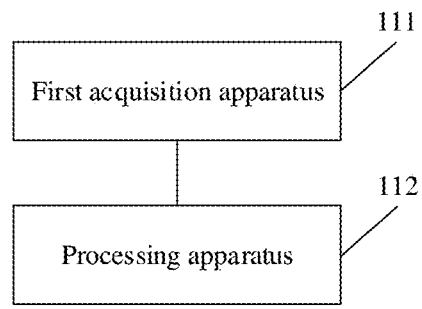
FIG. 11 is a schematic structural diagram of a security system according to an embodiment of the disclosure.

An embodiment of the disclosure also provides a security system, as shown in FIG. 11, the security system includes a first acquisition apparatus 111 and a processing apparatus 112.

The first acquisition apparatus 111 is configured to acquire at least two first images representing images of a payment behavior of a first user.

The processing apparatus 112 is configured to: obtain the at least two first images; analyze the at least two first images to obtain a first analysis result representing a payment result generated by the payment behavior; and determine identity information of the first user according to the first analysis result, the identity information representing whether the first user is a suspected user who has not made payment.

In a practical application, the first acquisition apparatus 111 is a camera, a webcam, or the like. The processing apparatus 112 is the foregoing processing center, which may be CPU, DSP, FPGA, or the like. The security system in the embodiment of the disclosure is the security system shown in any one of FIG. 6 to FIG. 8.

It may be noted that principles of solving problems by the recognition device and the security system in the embodiments of the disclosure respectively are similar to a principle of solving problems by the foregoing recognition method, therefore the process and principle of implementing the recognition device and the security system may refer to descriptions of the process and principle of implementing the foregoing method, and elaboration thereof is not repeated here.

Figure 12:
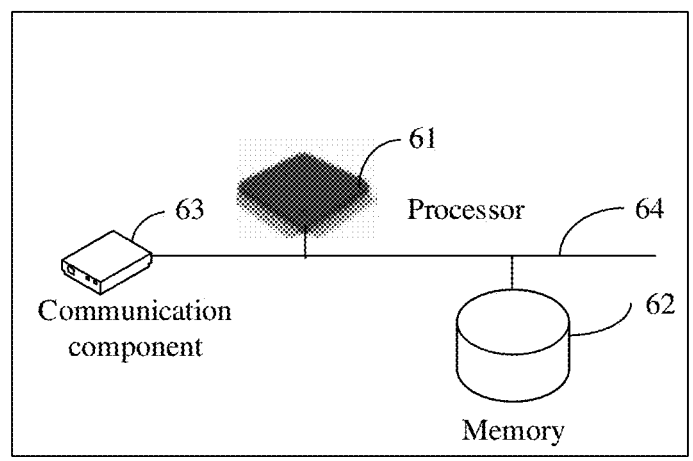
FIG. 12 is a schematic structural diagram of hardware of a recognition device according to an embodiment of the disclosure.

An embodiment of the disclosure also provides a computer-readable storage medium, having stored thereon computer programs, here the computer programs implement at least operations of any one of the methods shown in FIG. 1 to FIG. 5 and FIG. 9, when executed by a processor. Specifically, the computer-readable storage medium may be a memory. The memory may be a memory 62 as shown in FIG. 12.

An embodiment of the disclosure also provides a recognition device. FIG. 12 is a schematic structural diagram of hardware of a recognition device according to an embodiment of the disclosure. As shown in FIG. 12, the recognition device includes: a communication component 63 configured to perform data transmission, at least one processor 61, and a memory 62 configured to store computer programs executable on the processor 61. Components in this terminal are coupled together via a bus system 64. It may be understood that the bus system 64 is configured to implement connection communication among these components. In addition to a data bus, the bus system 64 also includes a power bus, a control bus, and a status signal bus. For clarity, however, various buses are marked as the bus system 64 in FIG. 12.

Here when the processor 61 executes the computer programs, the processor 61 implements at least operations of any one of the methods shown in FIG. 1 to FIG. 5 and FIG. 9.

It may be understood that the memory 62 may be a volatile memory or a non-volatile memory, or may include both the volatile memory and the non-volatile memory. Here the non-volatile memory may be Read-Only Memory (ROM), Programmable Read-Only Memory (PROM), Erasable Programmable Read-Only Memory (EPROM), Electrically Erasable Programmable Read-Only Memory (EEPROM), Ferromagnetic Random Access Memory (FRAM), Flash Memory, magnetic surface memory, Compact Disc (CD), or Compact Disc Read-Only Memory (CD-ROM). The magnetic surface memory may be a disk memory or a tape memory. The volatile memory may be Random Access Memory (RAM), which is used as an external cache. By way of exemplary descriptions rather than limitation, multiple forms of Random Access Memories (RAMs) may be used, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), and Direct Rambus Random Access Memory (DRRAM). The memory 62 described in the embodiment of the disclosure is intended to include, but is not limited to, these and any other suitable types of memories.

The above methods disclosed in the embodiments of the disclosure may be applied to, or implemented by, the processor 61. The processor 61 may be a kind of integrated circuit chip with capability of processing signals. In implementation, operations of the above methods may be completed by integrated logic circuits in form of hardware or instructions in form of software in processor 61. The processor 61 may be a general purpose processor, DSP, or another programmable logic device, discrete gate or transistor logic device, discrete hardware component, or the like. The processor 61 may implement or perform each of the methods, operations and logical block diagrams disclosed in the embodiments of the disclosure. The general purpose processor may be a microprocessor or any conventional processor, or the like. The operations in conjunction with the methods disclosed in the embodiments of the disclosure may be directly embodied as being performed by a hardware decoding processor or performed by a combination of hardware and software modules in a decoding processor. The software modules may be located in a storage medium which is located in the memory 62, and the processor 61 reads information in the memory 62 to complete the operations of the foregoing methods in conjunction with hardware thereof.

In an exemplary embodiment, the recognition device may be implemented by one or more Application Specific Integrated Circuits (ASICs), DSPs, Programmable Logic Devices (PLDs), Complex Programmable Logic Devices (CPLDs), FPGAs, general purpose processors, controllers, MCUs, microprocessors, or other electronic components, to perform the foregoing recognition methods.

In some embodiments provided by the disclosure, it may be understood that the disclosed device and method may be implemented in other manners. The device embodiment as described above is only schematic, for example, division of the units is only logic function division, and other division manners may be used during practical implementation. For example, multiple units or components may be combined or integrated into another system, or some features may be ignored or may not be executed. Furthermore, coupling or direct coupling or communication connection between displayed or discussed components may be indirect coupling or communication connection implemented through some interfaces, devices or units, and may be electrical, mechanical or in other forms.

The above units described as separate parts may be or may not be physically separated, and parts displayed as units may be or may not be physical units, namely, may be located in the same place, or may be distributed to multiple network units. Part or all of the units may be selected to achieve the purpose of the solutions in the embodiments according to a practical requirement.

Furthermore, functional units in each embodiment of the disclosure may be integrated into a processing unit, each unit may also be used as a unit independently, or at least two units may also be integrated into a unit. The above integrated units may be implemented either in form of hardware or in form of hardware and software functional units.

The methods disclosed in some method embodiments of the disclosure may be arbitrarily combined without conflict, to obtain a new method embodiment.

The features disclosed in some product embodiments of the disclosure may be arbitrarily combined without conflict, to obtain a new product embodiment.

The features disclosed in some method or device embodiments of the disclosure may be arbitrarily combined without conflict, to obtain a new method or device embodiment.

The foregoing descriptions are only specific embodiments of the disclosure, but the scope of protection of the disclosure is not limited thereto. Any variation or substitution which may be readily thought by those skilled in the art within the technical scope disclosed in the disclosure should fall within the scope of protection of the disclosure. Therefore, the scope of protection of the disclosure should be subject to the scope of protection of the claims.

The invention claimed is:

1. A recognition method applied to a security system, wherein the security system comprises a first camera and a processor, and the method comprises:
   obtaining, by the processor, at least two first images acquired by the first camera and representing images of a payment behavior of a first user;
   analyzing, by the processor, the at least two first images to obtain a first analysis result representing a payment result generated by the payment behavior;
   determining, by the processor, identity information of the first user according to the first analysis result, the identity information representing whether the first user is a suspected user who has not made payment;
   obtaining, by the processor, physiological characteristic information of the first user from at least one of the at least two first images, in response to determining the identity information of the first user to represent that the first user is the suspected user who has not made payment;
   storing, by the processor, the physiological characteristic information of the first user;
   obtaining, by the processor, at least one second image acquired by a second camera;
   obtaining, by the processor, physiological characteristic information of a user in the at least one second image;
   performing, by the processor, similarity match between the physiological characteristic information of the user and stored physiological characteristic information of users; and
   determining, by the processor according to a result of the similarity match, whether first reminder information is generated, the first reminder information reminding that the user is a historical suspected user.

2. The method of claim 1, further comprising:
   receiving, by the processor, a confirmation result on whether the first user has made payment;
   accordingly, wherein the determining, by the processor, the identity information of the first user according to the first analysis result comprises: determining, by the processor, the identity information of the first user according to the first analysis result and the confirmation result.

3. The method of claim 1, further comprising in response to determining, by the processor, the identity information of the first user to represent that the first user is the suspected user who has not made payment:
   receiving, by the processor, a confirmation result on whether the first user has made payment; and
   re-determining, by the processor, the identity information of the first user according to the confirmation result.

4. The method of claim 1, wherein the first camera comprises at least two first cameras, each of which is disposed at a different location;
   accordingly, the method further comprising:
      generating, by the processor, second reminder information, in response to the identity information representing that the first user is the suspected user who has not made payment, the second reminder information comprising that the first user is the suspected user who has not made payment and location information of one of the at least two first cameras acquiring the at least two first images of the first user.

5. The method of claim 1, wherein the first camera comprises at least two first cameras, each of which is configured to acquire the first images of the first user at a checkout apparatus associated with a corresponding one of the at least two first cameras, the method further comprising:

obtaining, by the processor, identifier information of one of the at least two first cameras, in response to obtaining the at least two first images acquired by the one of the at least two first cameras;

determining, by the processor, location information of a checkout apparatus associated with the one of the at least two first cameras at least according to the identifier information of the one of the at least two first cameras; and generating, by the processor, third reminder information, in response to the identity information representing that the first user is the suspected user who has not made payment, the third reminder information comprising that the first user is the suspected user who has not made payment and location information of the checkout apparatus associated with the one of the at least two first cameras which is capable of acquiring images of the suspected user who has not made payment.

6. A recognition device applied to a security system, comprising:

a memory for storing instructions;

a processor configured to execute the instructions stored in the memory to perform operations of:

obtaining at least two first images acquired by a first camera of the security system and representing images of a payment behavior of a first user;

analyzing the at least two first images to obtain a first analysis result representing a payment result generated by the payment behavior;

determining identity information of the first user according to the first analysis result, the identity information representing whether the first user is a suspected user who has not made payment;

obtaining physiological characteristic information of the first user from at least one of the at least two first images, in response to determining the identity information of the first user to represent that the first user is the suspected user who has not made payment;

storing the physiological characteristic information of the first user;

obtaining at least one second image acquired by a second camera;

obtaining physiological characteristic information of a user in the at least one second image;

performing similarity match between the physiological characteristic information of the user and stored physiological characteristic information of users; and determining, according to a result of the similarity match, whether first reminder information is generated, the first reminder information reminding that the user is a historical suspected user.

7. A non-transitory computer-readable storage medium, having stored thereon computer programs, wherein the computer programs, when executed by a processor of a security system, implement a recognition method, the method comprising:

obtaining at least two first images acquired by a first camera of the security system and representing images of a payment behavior of a first user;

analyzing the at least two first images to obtain a first analysis result representing a payment result generated by the payment behavior;

determining identity information of the first user according to the first analysis result, the identity information representing whether the first user is a suspected user who has not made payment;

obtaining physiological characteristic information of the first user from at least one of the at least two first images, in response to determining the identity information of the first user to represent that the first user is the suspected user who has not made payment;

storing the physiological characteristic information of the first user;

obtaining at least one second image acquired by a second camera;

obtaining physiological characteristic information of a user in the at least one second image;

performing similarity match between the physiological characteristic information of the user and stored physiological characteristic information of users; and determining, according to a result of the similarity match, whether first reminder information is generated, the first reminder information reminding that the user is a historical suspected user.

8. The recognition device of claim 6, wherein the processor is further configured to execute the instructions to perform operations of:

receiving a confirmation result on whether the first user has made payment;

accordingly, wherein the determining the identity information of the first user according to the first analysis result comprises: determining the identity information of the first user according to the first analysis result and the confirmation result.

9. The recognition device of claim 6, wherein the processor is further configured to execute the instructions to perform operations of: in response to determining the identity information of the first user to represent that the first user is the suspected user who has not made payment:

receiving a confirmation result on whether the first user has made payment; and re-determining the identity information of the first user according to the confirmation result.

10. The recognition device of claim 6, wherein the processor is further configured to execute the instructions to perform operations of:

generating second reminder information, in response to the identity information representing that the first user is the suspected user who has not made payment, the second reminder information comprising that the first user is the suspected user who has not made payment and location information of the first camera acquiring the at least two first images of the first user.

11. The non-transitory computer-readable storage medium of claim 7, wherein the method further comprises:

receiving a confirmation result on whether the first user has made payment;

accordingly, wherein the determining the identity information of the first user according to the first analysis result comprises: determining the identity information of the first user according to the first analysis result and the confirmation result.

12. The non-transitory computer-readable storage medium of claim 7, wherein the method further comprises: in response to determining the identity information of the first user to represent that the first user is the suspected user who has not made payment:

receiving a confirmation result on whether the first user has made payment; and re-determining the identity information of the first user according to the confirmation result.

13. The non-transitory computer-readable storage medium of claim 7, wherein the method further comprises:
generating second reminder information, in response to the identity information representing that the first user is the suspected user who has not made payment, the second reminder information comprising that the first user is the suspected user who has not made payment and location information of the first camera acquiring the at least two first images of the first user.

14. The non-transitory computer-readable storage medium of claim 7, wherein the method further comprises:
obtaining identifier information of the first camera, in response to obtaining the at least two first images acquired by the first camera;
determining location information of a checkout apparatus associated with the first camera at least according to the identifier information of the first camera; and
generating third reminder information, in response to the identity information representing that the first user is the suspected user who has not made payment, the third reminder information comprising that the first user is the suspected user who has not made payment and location information of the checkout apparatus associated with a first camera which is capable of acquiring images of the suspected user who has not made payment.

* * * * *